United States Patent [19]
Wetterling

[11] Patent Number: 5,905,630
[45] Date of Patent: May 18, 1999

[54] ELECTRIC DISTRIBUTION PANEL

[76] Inventor: James E. Wetterling, 9241 Jade Crest Dr., Las Vegas, Nev. 89134

[21] Appl. No.: 08/924,718

[22] Filed: Aug. 29, 1997

[51] Int. Cl.$^6$ ...................................................... H02B 1/26
[52] U.S. Cl. ............................................ 361/625; 361/627
[58] Field of Search .................................... 361/622–628, 361/631, 633–634, 641–644, 652, 673, 826–827, 828

[56] References Cited

U.S. PATENT DOCUMENTS

| | | | |
|---|---|---|---|
| 2,625,591 | 1/1953 | George | 361/601 |
| 2,988,655 | 6/1961 | Rudolph et al. | 361/625 |
| 3,343,041 | 9/1967 | Pistey et al. | 361/624 |
| 3,443,162 | 5/1969 | Nudelmont | 361/643 |
| 3,525,906 | 8/1970 | Schubert | 361/643 |
| 4,390,926 | 6/1983 | Hart | 361/625 |
| 4,425,598 | 1/1984 | Pyle | 361/623 |
| 5,212,623 | 5/1993 | Wilson et al. | 361/625 |

*Primary Examiner*—Gregory D. Thompson
*Attorney, Agent, or Firm*—Malloy & Malloy, P.A.

[57] ABSTRACT

An electric distribution panel having a substantially compact and lightweight housing to which a plurality of input receptacles are coupled. A first one of the input receptacles is structured to receive a ground cable coupled thereto, a second one of the input receptacles is structured to receive a neutral cable coupled thereto, and a third, fourth and fifth of the input receptacles are structured to receive a phased current cables in different phases from one another coupled thereto. Further disposed in the housing and removably coupled thereto is a load center having a ground bar coupled with the first input receptacle, a neutral bar coupled with the second input receptacle, and a plurality of circuit breakers through which the phased current from the third, fourth, and fifth input receptacles, which are coupled in conductive communication with the load center, passes to a plurality of output receptacles that are also disposed in conductive communication with the load center. The plurality of output receptacles are each removably coupled and are structured to distribute current at varying amperages from one another.

14 Claims, 3 Drawing Sheets

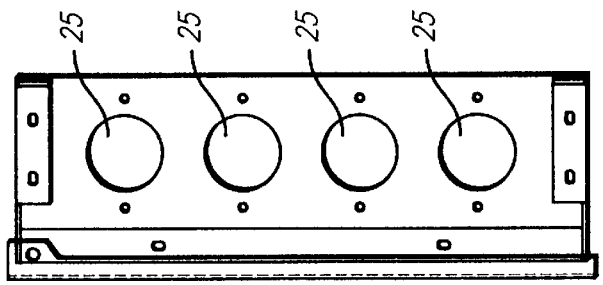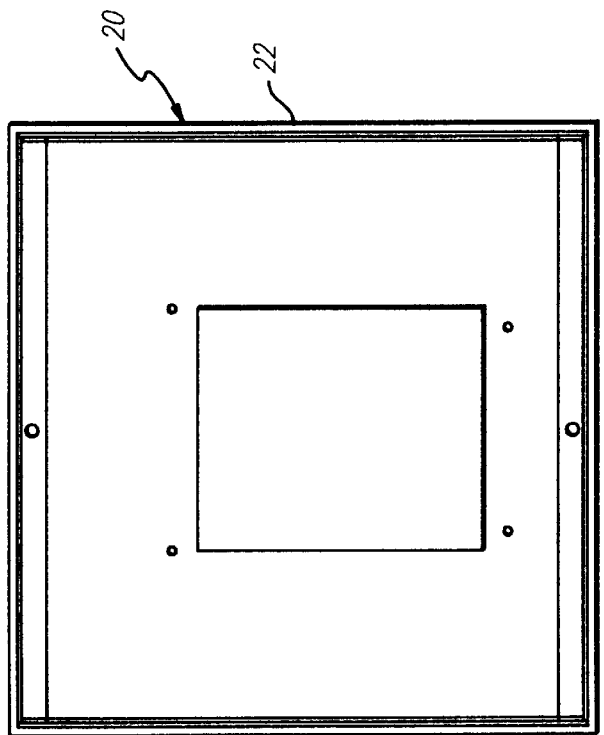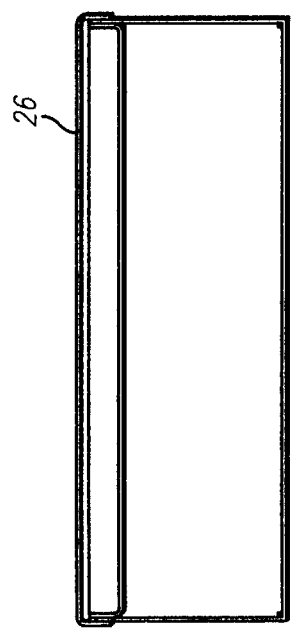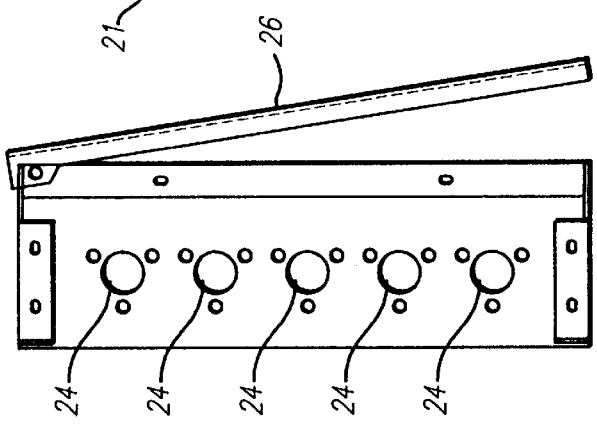

ELECTRIC DISTRIBUTION PANEL

BACKGROUND OF THE INVENTION

1. Field of the Invention

The present invention relates to an electric distribution panel to be implemented in a location where electrical service is needed on a temporary basis, so as to provide conveniently accessible electrical current in varied phases and at varied output amperages without requiring complex, heavy and/or malfunction susceptible wiring, and so as to provide immediate adaptability to meet a wide range of specific needs of a particular usage location.

2. Description of the Related Art

In a variety of industries it is often necessary for a temporary source of electricity to be disposed at a remote location. Furthermore, such a requirement is particularly the case when a large facility, such as a convention hall, is compartmentalized into a variety of individual areas, such as meeting rooms or display booths at a trade show or convention. In these environments, electric current is generally available at only a few specific, centralized locations and must be tapped in order to provide a large number of temporary current stations at each use location. Moreover, each current station will generally be required to supply power to a large variety of electrical items, such as computers, cash registers, display machinery, and the like, and must therefore be capable of meeting the demand with precision.

Presently in the industry, when such current stations are required, conventional electric/circuit breaker boxes are employed and connected to the current source. These electric boxes, however, are often quite large and heavy, as they are designed for permanent installation. As such, conventional electric boxes cannot generally be mounted in temporary usage locations which employ weak partitions or/and which have very limited floor or wall space that must remain uncluttered or used for another purpose. For example, in a normal trade show environment, temporary partitions are set up between booths, and adjacent booths often share a common wall/partition. Furthermore, space in the large conventional halls is sold at a high premium, with every added meter often costing extra to the user. Accordingly, large, conventional circuit boxes are not aesthetically or physically practical to use and install.

Moreover, conventional electric boxes have generally fixed electrical supply configurations such that it is substantially difficult to accommodate variations in the current needs at a particular current station. For example, it may be the case that at a particular current station different items require current in different phases from one another. Alternatively, it may be the case that current at different amperages must be provided to various items connected to the same current station. As such, it is often the case that conventional electric boxes must be "rigged" in complex or unsafe manners, such as through other electric boxes or adaptation devices, in order to accommodate the precise current needs at that current station. Of course, such modifications may not only be hazardous, but also increase the space and clutter of the current supply assembly. Indeed, it is noted that even at some usage locations where small in ground compartments are provided for utility reasons, conventional electric boxes will generally not fit, and because most installers faced with the problem of unique and varied current needs often turn to multiple box and/or larger, more complex systems in an attempt to meet at least some of the needs of the user, conventionally available and utilized systems are not practical.

Accordingly, it would be highly beneficial to provide an electric distribution panel which is able to safely and effectively accommodate current from a single current source, and provide a plurality of varied outputs. Such an electric distribution panel should be structured to be effectively and easily installed at a temporary location, such as on temporary partitions, and should be easily adaptable so as to meet the particular needs of the current station in a safe manner.

SUMMARY OF THE INVENTION

The present invention is directed to an electric distribution panel. The electric distribution panel is structured to be connected with a general current source so as to provide specific, customized current at a remote usage location, and includes a housing and a plurality of input receptacles coupled to the housing. Specifically, a first one of the input receptacles is structured to receive a ground cable from the current source coupled thereto, while a second one of the input receptacles is structured to receive a neutral cable from the current source coupled thereto. A third one of the input cables, however, is structured to receive a phased current cable coupled thereto, and as a result connects to the "hot" wire from which power will actually be drawn to operate various articles connected with the electric distribution panel.

The electric distribution panel of the present invention further includes a load center. The load center is preferably removably coupled to the housing and includes a plurality of circuit breakers disposed therein. The circuit breakers are disposed so as receive current flow therethrough from the third input receptacle. In particular, the third input receptacle is coupled in conductive communication with the load center such that current flowing into the load center passes through the circuit breakers in order to guard against overloads or short circuit damage. Furthermore, the load center includes a grounding bar coupled in conducting communication with the first input receptacle and a neutral bar coupled in conducting communication with the second input receptacle. As such, a full ground and neutral contact is also maintained at the load center.

The electric distribution panel further includes a plurality of output receptacles. Each of the output receptacles are structured to provide for the facilitated connection of a variety of different items which require electricity thereto. Moreover. each of the output receptacles is disposed in conductive communication with the load center. As such, current flowing from at least the third input receptacle to the lad center passes through the circuit breakers and to the output receptacles for supply to the user.

It is an object of the present invention to provide an electric distribution panel which is substantially compact and lightweight so as to facilitate unobtrusive and convenient installation at a remote usage location.

Still another object of the present invention is to provide an electric distribution panel which is capable of receiving current in a plurality of phases, and is structured to supply that current in varying phases and at varying amperage outputs so as to fulfill the particular needs of a usage location.

Yet another object of the present invention is to provide an electric distribution panel which includes a substantially modular, interchangeable construction so as to permit facilitated, on site variation thereof to correspond the particular needs at a usage location.

These and other objects will become readily apparent from the following detailed description and claims of the present invention.

BRIEF DESCRIPTION OF THE DRAWINGS

For a fuller understanding of the nature of the present invention, reference should be had to the following detailed description taken in connection with the accompanying drawings in which:

FIG. 4 is top plan view of the housing of the electric distribution panel of the present invention;

FIG. 5 is a left side view of the housing of the electric distribution panel of the present invention;

FIG. 6 is a right side view of the housing of the electric distribution panel of the present invention.

FIG. 8 Like reference numerals refer to like parts throughout the several views of the drawings.

DETAILED DESCRIPTION OF THE PREFERRED EMBODIMENT

Figure 3:
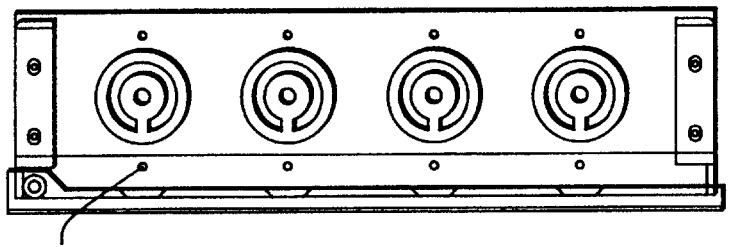
FIG. 3 is a right side view of the electric distribution panel of the present invention.
Figure 1:
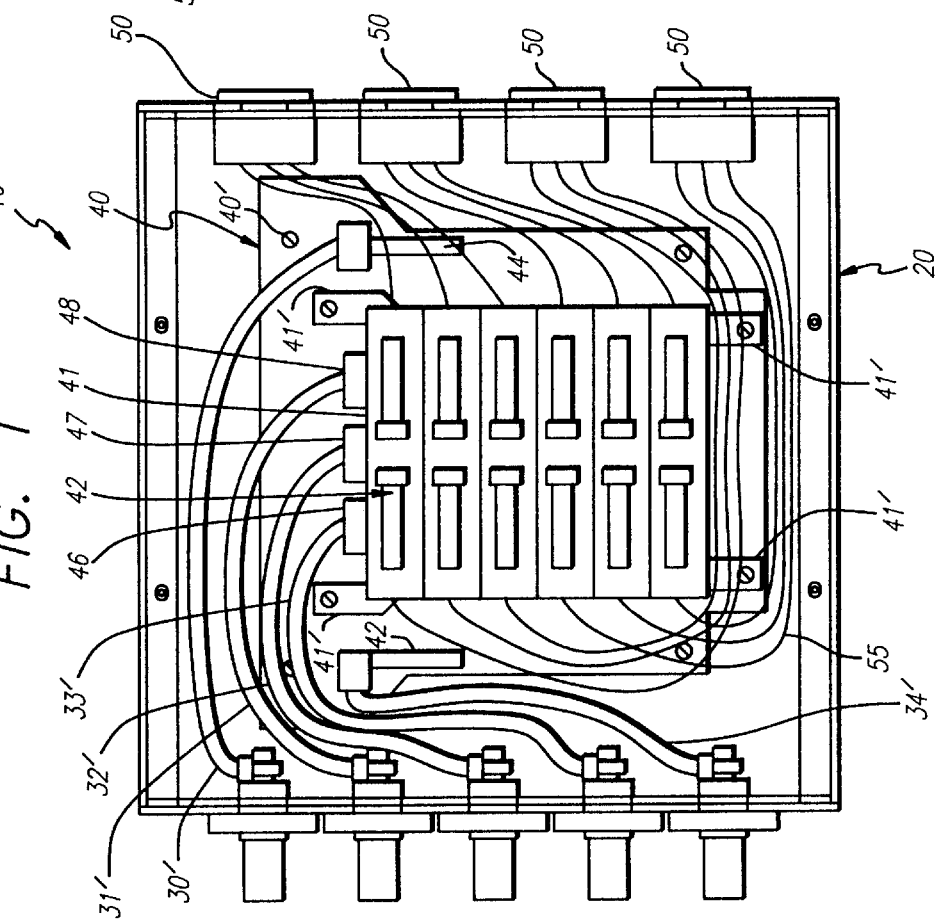
FIG. 1 is a top elevation view of the electric distribution panel of the present invention without a cover plate.
Figure 2:
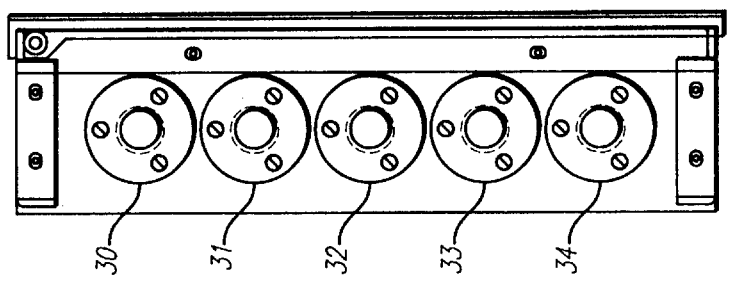
FIG. 2 is a left side view of the electric distribution panel of the present invention.

Shown throughout the FIGS. 1–7, the present invention is directed towards an electric distribution panel, generally indicated as 10. The electric distribution panel 10 is structured to be substantially lightweight and portable so as to be quickly and easily installed at a remote usage location in order to effectively and precisely meet the particular current needs at that usage location.

The electric distribution panel 10 of the present invention includes a housing 20. The housing 20 is preferably formed of marine grade aluminum and is therefore substantially lightweight and substantially portable. Moreover, in the preferred embodiment, the housing 20 includes a box-like configuration. Preferably, the housing 20 is also substantially small so as to be removably mounted to a vertical support surface, such as a temporary partition or other generally lightweight structure, or to be removably positioned within a smallish utility recess disposed in an underlying floor surface, without taking up a substantial amount of space and/or detracting from the aesthetic or practical appearance and layout of a usage location. In the preferred embodiment, the housing 20 preferably has dimensions of approximately 13"×13", with a depth of generally about 4½ inches. As such, the substantially portable and concealable nature of the electric distribution panel 10 is maintained by the housing 20, and in fact the generally lightweight nature of the housing 20 does not contribute to excess weight of the electric distribution panel 10.

Looking to FIG. 5, the housing 20 preferably includes a first series of mount ports 24 extending along a side panel 21 of the housing 20. These mount ports 24 are each structured and disposed to receive one of a plurality of input receptacles 30, 31, 32, 33 and 34 therein. Specifically, the input receptacles 30, 31, 32, 33 and 34 are structured to be removably coupled to the housing 20, and in the preferred embodiment five input receptacles 30, 31, 32, 33 and 34 are incorporated and coupled to the housing 20. Preferably, the input receptacles 30, 31, 32, 33 and 34 are coupled to the housing 20 in an easily removable fashion, such as through one or more mounting screws extending therethrough into the housing 20. Furthermore, each of the input receptacles 30, 31, 32, 33 and 34 preferably includes a standard twist lock type plug configuration so as to facilitate interconnection of various cables in conductive communication at the input receptacles 30, 31, 32, 33 and 34.

In particular, a first one of the input receptacles 30 is structured to receive a ground cable "G" coupled thereto. Similarly, a second one of the input receptacles 34 is structured to receive a neutral cable "N" coupled thereto. At least one, but preferably all of the remaining input receptacles 31, 32 and 33, however, are structured to receive phased current cables coupled thereto. Specifically, in most conventional electrical environments, the "hot" current cables supply current in one of at least three phases. As such, in the preferred embodiment of the electric distribution panel 10 of the present invention wherein five (5) input receptacles are provided, the third, fourth and fifth input receptacles 31, 32 and 33 are structured to be coupled in conductive communication with phased current cables A, B and C having different phases from one another. As such, unlike a conventional single phase stringer current connection, the electric distribution panel 10 of the present invention has the capability of selectively supplying current in multiple phases.

The electric distribution panel 10 of the present invention further includes a load center, generally 40 coupled to the housing 20. Preferably, the load center 40 is removably coupled to the housing 20, such as a by series of removable fasteners 40' which extend through the load center 40 and the housing 20. As such, removability and interchangeability of the load center 40 can be easily achieved in order to accommodate the specific needs of an usage location and/or to provide quick repair and/or replacement. In the preferred embodiment, a conventional 150 AMP load center is utilized, although it is understood that other amperage load centers could be employed. Also included as part of the load center 40, and preferably removably secured thereto by a series of removable fasteners 41', is a breaker panel 41. In particular, the breaker panel 41 is structured to receive a plurality of circuit breakers 42 therein as part of the load center 40. Indeed, it is noted that the circuit breakers 42 themselves are preferably structured to be plugged into the breaker panel 41, and as such can be removed from the breaker panel, if necessary, such as if one or more of the breakers should blow or burnout and thereby need replacing.

Preferably, the third, forth and fifth input receptacles 31, 32 and 33 are coupled in conductive communication with the load center 40, such as through a series of internal cables 31', 32' and 33' which extend from a series of inputs 46, 47 and 48 disposed at the load center 40, such as at the breaker housing 41. Moreover, as indicated in the Figures, those cables 31', 32' and 33' are preferably connected to the load center 40 such that the current passing therefrom passes through the plurality of breakers 42. As such, the phased current introduced at the input receptacles 31, 32, and 33 necessary flows through the plurality of breakers 42 before any output is supplied such that the breakers 42 can effectively function to prevent overloading. It is also noted that the interior cables 31', 32' and 33' are preferably removably coupled to the input receptacles 31, 32 and 33, such as through standard clamping connections, so that upon removal and/or interchanging of the load center 40 or any component thereof from the housing 20, the input receptacles 31, 32 and 33 may remain effectively secured in place, if appropriate.

The load center 40 of the present invention further includes a grounding bar 44 and a neutral bar 42. Specifically, the grounding bar 44 is coupled in conductive communication, such as through an interior cable 30', to the first input receptacle 30 that receives the ground cable G. Similarly, the neutral bar 42 is connected to the fifth input receptacle 34, such as through an interior cable 34', such that the neutral bar 42 is coupled in conductive communication with the neutral cable "N".

Further coupled to the housing 20 of the electric distribution panel 10 are a plurality of output receptacles 50. Specifically, the output receptacles 50 are disposed within a series of ports 25 in a side panel 22 of the housing 20. These ports 25 removably receive each of the output receptacles 50, such as utilizing one or more removable fasteners 52. As such, facilitated and rapid removal and interchanging of the output receptacle 50 as desired can be achieved.

The output receptacles 50 are disposed in conductive communication with the load center 40, such as through a series of wires 55. Indeed, it is seen that by being connected with the load center 40, the output receptacles 50 are structured to be coupled in conductive communication with the plurality of input receptacles 31, 32 and 33 which carry the phased current into the load center 40. Moreover, the wires 55' which are connected to the output receptacles 50 preferably lead from the breaker panel 41 and are therefore disposed such that the phased current passes from the input receptacles 31, 32 and 33 to the output receptacles 50 through the plurality of circuit breakers 42. Moreover, the wires 55 are preferably removably connected to the output receptacles 50 so as to be connectable in a plurality of output configurations and so as to facilitate removal and interchanging of the output receptacles 50 in order to meet the specific output needs of the electric distribution panel 10 at a particular usage location. For example, 15 AMP, 20 AMP, 30 AMP, 60 AMP, etc. output receptacles 50 may be utilized in any desired combination, with each output receptacle 50 providing current in any desired phase. As indicated, this is achieved merely by changing the configuration and combination of wires 55 connected to the particular output receptacles 50, and by utilizing a particular desired output receptacle 50 that provides the necessary amperage connection and phase connections. It is therefore seen, that at a particular usage location, a plurality of different output receptacle 50 may be made available and can be specifically and removably installed in the housing 20 once the particular current and/or phase needs for the electric distribution panel 10 at that usage location have been determined. Of course, each of the output receptacles 50 includes a conventional mating plug type configuration in an exteriorly exposed region thereof so as to facilitate the connection of various electric components or individual outlets thereto, as necessary.

Figure 7:
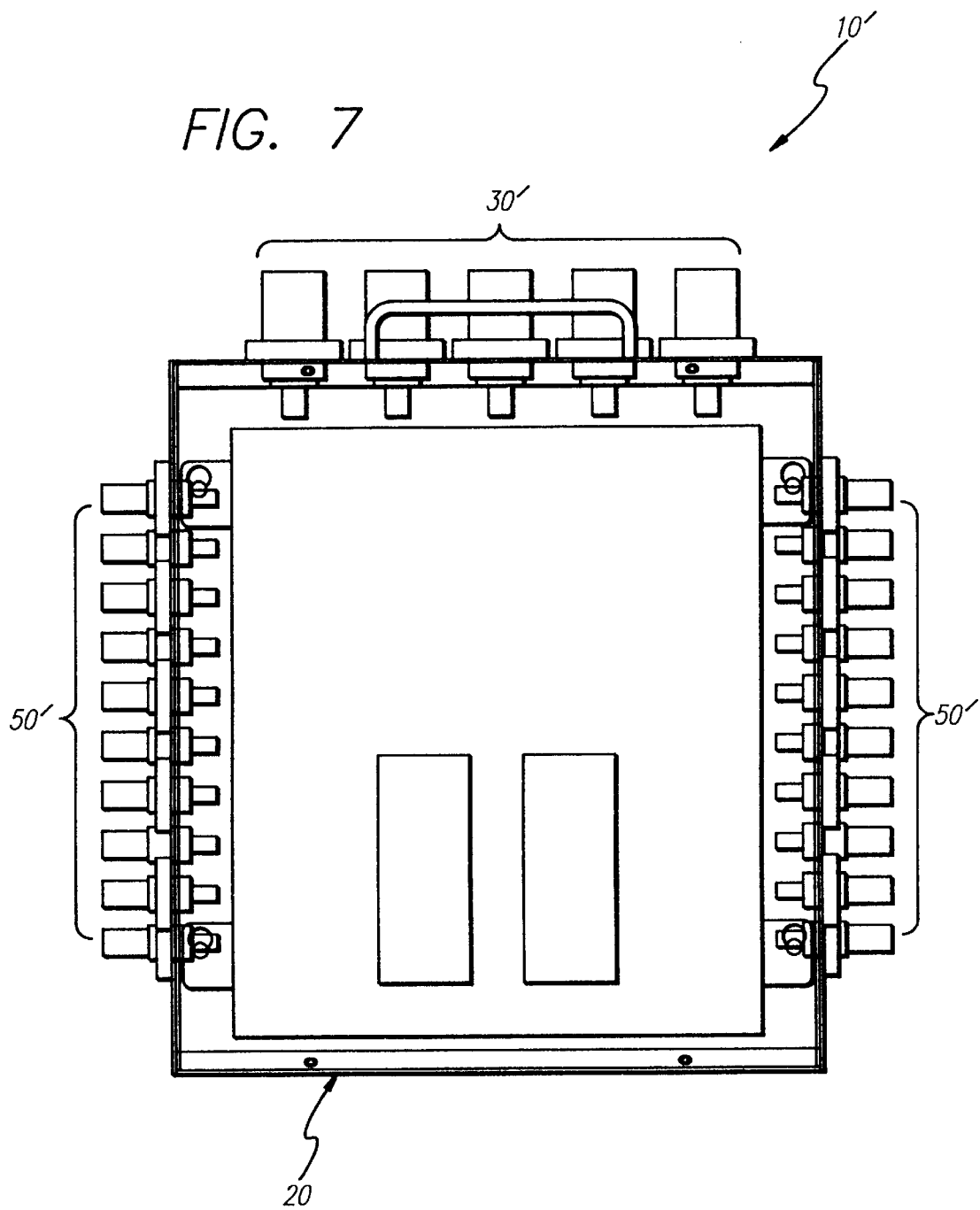
FIG. 7 is a top elevation view of the electric distribution panel of the present invention in its load hub embodiment.

Turning to the embodiment of FIG. 7, an alternative embodiment of the electric distribution panel 10' is shown for use as a load hub. Specifically, in many facilities wherein the electric distribution panel 10' of the present invention is required, current is provided from a single, large source for subsequent distribution at each of the preferred embodiment, smaller electric distribution panels 10. Similar problems as previously recited, however, also occur when seeking to distribute the current to the varying output sites, such that it is beneficial to have the modifiable, interchangeable, and effective electric distribution panel 10' of the present invention as a load hub to distribute power to the various sites. In this embodiment, the preferred five input receptacles 30' are also preferably included, although the "hot" connections are of higher power. Moreover, the preferred load center is a 400 amp load center capable of accepting the greater input. Preferably, this alternative embodiment also includes a greater number of output receptacles 50' than the first, smaller embodiment, and indeed, those output receptacles 50' are preferably quite similar to the input receptacles 30, 31, 32, 33 and 34 of the smaller embodiment since conductive communication will preferably be defined therebetween.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An electric distribution panel comprising:
   a housing;
   a plurality of input receptacles coupled to said housing;
   a first one of said input receptacles being structured to receive a ground cable coupled thereto;
   a second one of said input receptacles being structured to receive a neutral cable coupled thereto;
   a third one of said input receptacles being structured to receive a phased current cable coupled thereto;
   a load center coupled to said housing, said load center including a plurality of circuit breakers;
   said load center including a ground bar coupled in conductive communication with said first input receptacle;
   said load center including a neutral bar coupled in conductive communication with said second input receptacle;
   said load center being coupled in conductive communication with at least said third input receptacle; and
   a plurality of output receptacles, each of said output receptacles disposed in conductive communication with said load center and therefore with said third input receptacle, through said plurality of circuit breakers.

2. An electric distribution panel as recited in claim 1 wherein at least two of said output receptacles are structured to supply current at different amperages from one another.

3. An electric distribution panel as recited in claim 1 wherein said housing is substantially lightweight and therefore substantially portable.

4. An electric distribution panel as recited in claim 3 wherein said housing is formed of marine grade aluminum.

5. An electric distribution panel as recited in claim 3 wherein said housing is substantially small and structured to be removably mounted to a vertical support surface.

6. An electric distribution panel as recited in claim 3 wherein said housing is substantially small and structured to be removably within a recess disposed in an underlying floor surface.

7. An electric distribution panel as recited in claim 3 further including a fourth and a fifth ones of said input receptacles, said fourth and said fifth input receptacles being structured to receive one of said phased current cables coupled thereto, and
   said third, fourth and fifth input receptacles being structured to receive said phased current cables having different phases from one another so as to provide current in all phases to said load center so as to selectively provide said current in all phases to said output receptacles.

8. An electric distribution panel as recited in claim 7 wherein each of said output receptacles is structured to accommodate said current in different phases from one another.

9. An electric distribution panel as recited in claim 1 further including a fourth and a fifth ones of said input receptacles, said fourth and said fifth input receptacles being structured to receive one of said phased current cables coupled thereto, and said third, fourth and fifth input receptacles being structured to receive said phased current cables having different phases from one another so as to provide current in all phases to said load center so as to selectively provide said current in all phases to said output receptacles.

10. An electric distribution panel as recited in claim 9 wherein each of said output receptacles is structured to accommodate said current in different phases from one another.

11. An electric distribution panel as recited in claim 1 wherein said load center is removably secured to said housing so as to facilitate adjustment and adaptation thereof.

12. An electric distribution panel as recited in claim 11 wherein said output receptacles are removably coupled to said housing so as to facilitate interchangeability therebetween.

13. An electric distribution panel as recited in claim 12 wherein each of said output receptacles is structured to accommodate said current in different phases from one another.

14. An electric distribution panel as recited in claim 1 wherein said load center is a 400 amp load center.

* * * * *